Oct. 24, 1967     O. F. BOYKIN     3,348,971

METHOD OF MAKING A THIN FILM CAPACITOR

Original Filed May 28, 1963

INVENTOR

OTIS F. BOYKIN

BY *John J. Gaydos*

ATTORNEY

United States Patent Office 3,348,971
Patented Oct. 24, 1967

3,348,971
METHOD OF MAKING A THIN FILM CAPACITOR
Otis F. Boykin, 8215 Maryland Ave.,
Chicago, Ill. 60619
Original application May 28, 1963, Ser. No. 283,729. Divided and this application Apr. 6, 1966, Ser. No. 540,642
6 Claims. (Cl. 117—215)

ABSTRACT OF THE DISCLOSURE

A method of making a capacitor by depositing and bonding a bottom electrode containing at least one of the noble metals which do not oxidize at a temperature below 800° C. onto an electrically nonconductive substrate and depositing onto the electrode a relatively thin layer of material comprising at least one metal compound, the metal constituent thereof being selected from the group consisting of barium, calcium, strontium, copper, nickel, lead, tin, tantalum, zirconium, niobium, aluminum, titanium, hafnium, and tungsten. The metal constituent can be in the form of fine metal particles or an organic metal compound in solution admixed with glass particles or particles of glass-forming organic metal compounds in solution. The substrate with the electrode and the layer of material is then fired below a temperature of 800° C. to fuse the glass particles and bond the metal compound to the electrode. A top electrode is then deposited over the dielectric film to form a capacitor.

---

Figure 1:
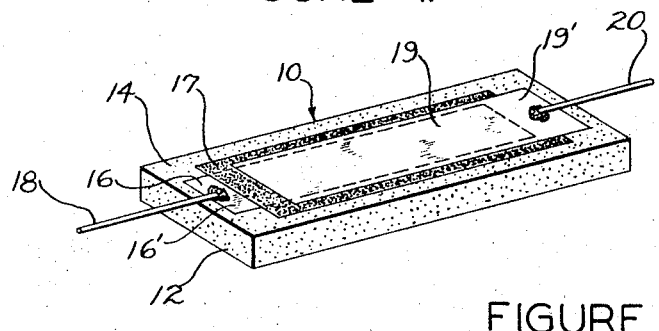

The present invention is a division of application Serial No. 283,729, filed May 28, 1963 and now abandoned, and relates to capacitors and, more particularly, to a thin film capacitor having an oxidized layer of a film forming metal as the dielectric and to a method of making the same.

Capacitors employing a coating of a metal oxide have heretofore been used in printed circuits and the like. It is well known that a group of metals including tantalum, tungsten, aluminum, niobium, titanium, hafnium, and zirconium, the oxides of which are known to be excellent dielectric materials, are well adapted for use in the production of thin film capacitors. A few years ago, capacitors for printed circuits were primarily of the ceramic disc type and, in order to provide sufficient mechanical support for the capacitor, a relatively thick dielectric was necessary even though the thickness of the dielectric is inversely proportional to the capacitance. A major improvement was not made in the ceramic capacitor art until the U.S. Patent to Kilby No. 2,759,854 revealed a method of manufacturing capacitors wherein a thin dielectric in the order of .003 of an inch was, e.g., screened onto a surface of an electrode deposited on a substrate. The dielectric consisted of a ceramic material which had to be fired at a temperature of approximately 2500° F. to cure the material and bond it to the electrode. Thus it was necessary that the electrode consisted of a metal, e.g., platinum, capable of withstanding temperatures in excess of 2500° F. Metals better adapted for electrodes, such as gold, because of a lower specific resistance, could not be employed because they had lower melting temperatures.

A further improvement in capacitors resulted by vacuum depositing a metal in an extremely thin film onto a substrate and then oxidizing the surface of the metal to form a dielectric. Although these capacitors, more commonly referred to as "vacuum deposited capacitors," have operated satisfactorily in various types of printed circuits, the manufacturing cost thereof has been rather high since special and expensive equipment and facilities are involved in vacuum evaporation techniques, as well as requiring anodization to form the oxide. It would, therefore, be desirable to provide a new and improved thin film capacitor which may be produced in a simple, inexpensive, and facile manner. Another reason contributing to the high cost of the thin film capacitors has been due to the high rejection rate of the completed capacitors when the capacitors are inspected and tested. A high percentage of the vacuum deposited capacitors fails when subjected to a predetermined test voltage since such capacitors generally have a very poor or low working voltage. The low working voltage is due primarily to the fact that the thickness of the dielectric is self-limiting because of anodization. During anodization, the surface of the metal may be oxidized only once and the thickness of the oxidized layer is limited by the process. It would, therefore, also be desirable to provide a thin film capacitor for use in printed circuitry wherein the thickness of the dielectric film may be readily increased to improve the working voltage of the capacitor. When utilizing capacitors in a printed circuit, it is preferable to employ capacitors having a high Q, i.e., a high operating efficiency, which is inversely proportional to the dissipation factor. The vacuum deposited capacitors, because of their extremely thin dielectric or oxide layer formation, generally have a poor dissipation factor of approximately 5 percent. It would, therefore, be desirable to provide a thin film capacitor which has a dissipation factor of less than one quarter of 1 percent in order to improve the Q thereof.

Accordingly, it is an object of the present invention to provide a new and improved thin film capacitor having the various desirable features set forth above. An additional object of the present invention resides in a thin film capacitor having a uniform capacitance throughout a wide frequency range. Another object of the present invention is to provide a thin film capacitor which may withstand a much higher working voltage than heretofore possible. A further object of the present invention is to provide an improved thin film capacitor having an extremely low dissipation factor in order to improve the efficiency of the capacitor. Still another object of the present invention resides in an improved method of making a thin film capacitor having an oxidized layer comprising one or more film-forming metals in a vitreous matrix as the dielectric. A still further object of the present invention is to provide a thin film capacitor having an improved temperature coefficient. Further objects and advantages of the present invention will become apparent as the following description proceeds, and the features of novelty which characterize the invention will be pointed out with particularity in the claims annexed to and forming a part of this specification.

Essentially, the capacitor of this invention consists of a first conductive layer fused onto a ceramic substrate, a film of one or more of the aforesaid metals, i.e., tantalum, tungsten, aluminum, niobium, titanium, hafnium, and zirconium, in a vitreous matrix fused onto the first conductive layer, but converted into an oxide of the metal upon firing to form a dielectric film, and a second conductive film fused onto and covering a substantial area of the dielectric film.

Figure 2:
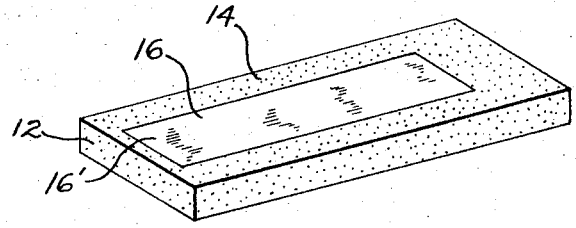
Figure 3:
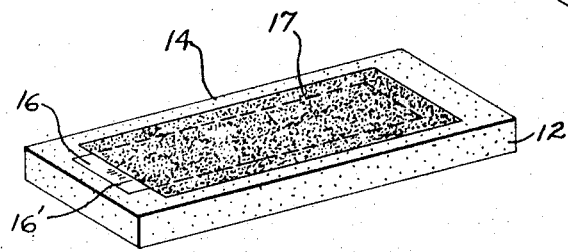
Figure 4:
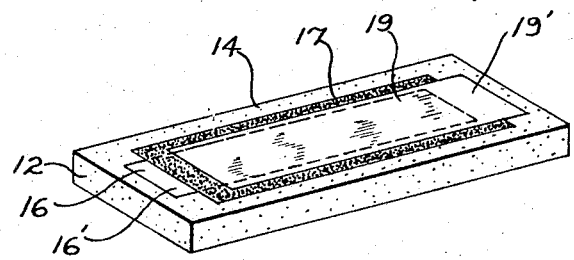

For a better understanding of the invention, reference may be had to the accompanying drawing in which: FIGURE 1 is an isometric view of a thin film capacitor made in accord with the present invention; FIGURE 2 is an isometric view illustrating the result of the first step in the method of producing the capacitor; FIGURE 3 is an isometric view illustrating the result of the second step; and FIGURE 4 is an isometric view illustrating the result of the fourth step in the production of the capacitor.

Referring now particularly to the accompanying drawing, there is illustrated a thin film capacitor, generally indicated at 10, which comprises a substrate 12 having a top surface 14. The substrate 12 may be part of a panel adapted to have printed circuits applied thereto, but in the present case is illustrated simply as a rectangular slab of suitable insulating material, preferably a ceramic such as alumina. Fused onto the surface 14 of the substrate 12 is a layer 16 of metal of good conductivity to provide the first electrode of the capacitor 10. Fused onto the first electrode is a dielectric film 17 (see FIGURE 3) comprising an oxide of a metal or a combination of oxides chosen from the group consisting of tantalum, zirconium, aluminum, titanium, niobium, hafnium, and tungsten, in a matrix or binder of glass. If a capacitor with specific characteristics is desired, then one or more of the above-mentioned metals is combined with barium, calcium, strontium, copper, nickel, lead, tin, etc. The dielectric film 17 covers all but an end portion 16' of the layer 16, the end portion 16' having a terminal 18 attached thereto in any suitable manner. As best shown in FIGURE 4 of the drawings, the second electrode of the capacitor 10 comprises a layer 19 of metal of good conductivity fused onto the dielectric film 17. The layer 19 is coextensive in area with a substantial portion of the first electrode, i.e., the film 16, and in addition has one end portion 19' thereof extended out and fused onto the surface 14 of the substrate 12, a terminal 20 being attached to the end portion 19' in any suitable manner. The conductive layers 16 and 19 comprise a nonoxidizing noble metal, preferably gold, dispersed in finely divided form in a vitreous matrix. Each of the layers initially comprises an admixture of an organic metal solution, e.g., a liquid gold resinate (if gold is used, though other non-oxidizing noble metals, i.e., metals which do not oxidize below firing temperatures of 800° C., such as platinum, may be used), and powdered glass and, if desired, an organic screening agent such as ethyl cellulose. The electrode forming admixture is screened onto the surface 14 of the substrate 12 and then onto the dielectric layer 17, each layer being fired at a temperature above the melting point of the glass, but below that of the gold, to drive off the organic vehicles and fuse the glass. Each of the layers is about 50,000 angstroms thick. After the layer 16 has been fused onto the surface 14 of the substrate 12, the dielectric-forming film 17 is applied thereonto. In accord with the present invention, the film 17 is formed by mixing at least one organic metal compound in solution, e.g., a tantalum resinate or mixture thereof, which when oxidized, forms a good dielectric material, with resinates of lead, boron, and silicon. These latter resinates will, of course, produce glass. Upon firing in an oxidizing atmosphere, the organic vehicles are driven off, the tantalum oxidized to form tantalum pentoxide, and the glass molecularly bonds the tantalum pentoxide particles to each other and to the conductive layer 16.

It is to be understood that the conductive layers, the dielectric-forming material, and each of the raw materials employed in preparing the glass initially need not be organic metal compounds and can be an organosol, e.g., fine particles of glass colloidally dispersed in an organic liquid. It has been found, however, that organic metal compounds in solution such as metal resinates, glycinates, etherates, esterates, and naphthanates are preferable since the particles are in molecular form and may be readily admixed with each other. In accord with the present invention, one or more of the dielectric-forming metals, e.g., titanium, is reacted with one or more metals such as barium, calcium, strontium, copper, nickel, lead, and tin to produce dielectric compounds having preferred characteristics. These compounds or complex compounds of titanium, zirconium, tantalum, aluminum, tungsten, hafnium, and niobium are employed for making capacitors having preferred characteristics such as temperature compensating or frequency independent capacitors. For example, strontium titanate capacitors have an extremely high straight line frequency response. Quite similarly, temperature compensation capacitors may be formed. The titanates also form excellent dielectrics and, by varying the composition of the dielectric compound and the glass resinate, a very high dielectric constant can be obtained. In a preferred form of the invention, two organic metal compounds in solution, e.g., a resinate of titanium and a resinate of barium are admixed and form a barium titanate compound upon being fired in an oxidizing atmosphere. The entire admixture of resinates, with the addition of a suitable screening agent and glass-forming resinates, is screened onto the layer 16 and beyond the side edges and one end thereof while leaving the opposite end 16' thereof uncovered. The film 17 comprising the selected resinates deposited on the surface 14 of the substrate 12 is then fired in an oxidizing atmosphere to drive off the organic vehicles and leave the metals, in the form of a compound such as barium titanate bonded in position and held in place by the fused glass. In effect, the oxide of at least one metal or the mixture of several metal oxides or compounds is bonded and embedded in the resulting glass matrix. Thus the dielectric layer is made by reacting at least one of the metal compounds, the metallic constituent being selected from the group consisting of barium, calcium, strontium, copper, nickel, lead, and tin, with a metal compound, the metallic constituent being selected from the group consisting of zirconium, titanium, tantalum aluminum, tungsten, hafnium, and niobium. Usually one or more extremely thin layers of the film 17 comprising the dielectric-forming resinates are screened onto the substrate to form the dielectric film 14, each layer of the film 17 being fired in an oxidizing atmosphere before the succeeding layer is screened thereonto, and the number of layers generally depending upon the working voltage desired.

Generally imperfections or irregularities in the surface 14 of the substrate 12 extend up through the layer and also probably through the dielectric film 17 and have a tendency of shorting out the capacitor at low voltages if the dielectric film 17 comprises only one thin layer. By producing the dielectric film 17 in successively applied layers, it is easier to maintain the dielectric film 17 as thin as possible and, accordingly, produce a thin film capacitor 10 which can withstand breakdown voltages in excess of 500 volts D.C. It is to be understood, however, that one layer of the film 17 may be sufficient for certain capacitors operating at lower voltages. After the dielectric film 17 of the proper layers is produced, the second layer 19 is fused onto the dielectric film 17 by screening or otherwise applying a liquid gold solution or gold organic metal compound in solution with powdered glass and, when necessary, a suitable screening agent may be added to control the viscosity of the admixture, the layer being fired to drive off the organic vehicles and fuse the layer 19 of metal to the dielectric film 17 and to portions of the surface 14 of the substrate 12.

For those skilled in this art, the foregoing explanation and description is no doubt sufficient to enable them to practice the invention without further information, but to assure against any possible misunderstanding, the following examples of specific formulae for the production of the dielectric film are offered:

*Example I*

|  | Metallic residue, percent |
|---|---|
| 10 parts of 10% solution tantalum resinate | 17.5 |
| 4 parts of 27.8% solution lead resinate | 44.0 |
| 4 parts of 3.8% solution boron resinate | 1.0 |
| 1 part of 7% solution zinc resinate | 2.5 |
| 8 parts of screening agent | |

As the resinates comprising the dielectric film 17 of Example I are fired at a temperature of approximately 800° C., a substantial proportion of the lead combines with the tantalum, to form lead tantalate, an excellent dielectric. The zinc also combines with the lead tantalate and forms a complex compound of zinc lead tantalate, the zinc being employed to improve the K factor of the dielectric. If desired, a small amount of a silicon resinate may be added to the admixture of Example I to vary, e.g., the melting point of the glass.

*Example II*

|  | Metallic residue, percent |
|---|---|
| 10 parts of 10% solution tantalum resinate | 18.0 |
| 4 parts of 27.8% solution lead resinate | 45.5 |
| 4 parts of 3.8% solution boron resinate | 1.0 |
| 8 parts of screening agent | |

In Example II, the dielectric comprises a combination of the tantalum dioxide and lead tantalate, the dielectric being employed for producing low value capacitors. A small amount of silicon may also be added to vary the properties of the glass.

*Example III*

|  | Metallic residue, percent |
|---|---|
| 50 parts of 10% solution titanium resinate | 7.0 |
| 37.5 parts of 27.8% solution barium resinate | 30.0 |
| 37.5 parts of 3.8% solution boron resinate | 5.0 |
| 30 parts of 9.7% solution calcium resinate | 1.95 |
| 90 parts of screening agent | |

By combining the calcium with the barium titanate to form calcium barium titanate, a capacitor having an extremely stable temperature coefficient is generally obtained. Although unnecessary, lead and silicon resinates may be employed to alter the properties of the glass.

*Example IV*

|  | Metallic residue, percent |
|---|---|
| 30 parts of 10% solution strontium resinate | 8.4 |
| 10 parts of 10% solution zirconium resinate | 5.0 |
| 20 parts of 10% solution tantalum resinate | 10.0 |
| 30 parts of 27.8% solution lead resinate | 30.0 |
| 30 parts of 3.8% solution boron resinate | 5.0 |
| 100 parts of screening agent | |

The capacitor produced with the resinates of Example IV may be employed in a high frequency circuit since the capacity thereof is independent of frequency within a broad range.

*Example V*

|  | Metallic residue, percent |
|---|---|
| 40 parts of 10% solution tungsten resinate | 4.0 |
| 30 parts of 27.8% solution lead resinate | 30.0 |
| 20 parts of 3.8% solution boron resinate | 5.0 |
| 30 parts of screening agent | |

The capacitor produced with the resinates of Example V is similar to the capacitor obtained from Example II.

A very significant advantage of this invention resides in the fact that all of the materials used in the production of the thin film capacitor 10 are liquid. This makes handling and admixture of the chosen organic metal compounds in solution a very simple and facile process. Also, there is nothing complicated about the technique of screening these admixtures onto the substrate; and the firing of the materials, of course, can be effected in any conventional oven capable of producing temperatures of approximately 800° C., i.e., high enough to melt the glass but not the metals employed for the layers 16 and 19 as well as those employed to produce the dielectric film 17. Procedurally, and as indicated in the examples, various glass forming organo compounds may be utilized, the type of glass not being critical to the practice of the invention so long as the melting temperature of the glass is substantially less than the melting point of the metal employed in the electrodes. Further, various changes in the glass composition can be made to alter the fusion temperature, coefficient of thermal expansion, fluidity, solubility and the like by a person skilled in the ceramic art to produce a particular desired characteristic.

While it is preferable to form the electrodes by means of the screening and firing process hereinbefore described, it is to be understood that the electrodes need not be produced in this manner. For instance, the electrodes may be flame sprayed, vacuum deposited or be in the form of a leaf as long as the electrodes are properly bonded to the substrate and to the dielectric film. One of the important attributes of the invention lies in the fact that the dielectric film is produced by firing an admixture of organic metal solutions containing a substantial proportion of at least one of the aforesaid group of metals, namely, tantalum, zirconium, aluminum, titanium, niobium, hafnium, and tungsten, each of the oxides thereof or the compounds containing the oxides or mixtures of such compounds being excellent dielectric materials, admixing one or more of the organic metal solutions with a glass forming organo compound, or an organosol, and effecting the firing in an oxidizing atmosphere so that the conversion of the selected metal to its oxide is accomplished as an incidental part of the fusion of the glass onto the underlying surface.

From the foregoing description, it should be readily apparent to those skilled in this art that this invention provides a thin film capacitor, especially well adapted for use in printed circuitry and that it provides a greatly improved, simplified, and far less costly way of producing such capacitors. While there has been illustrated and described what is at present considered to be a preferred embodiment of the present invention and a method of making the same and a single modification thereof, it will be appreciated that numerous changes and modifications are likely to occur to those skilled in the art, and it is intended in the appended claims to cover all of those changes and the modifications which fall within the true spirit and scope of the present invention.

What is claimed as new and desired to be secured by Letters Patent of the United States is:

1. The method of making a capacitor comprising the steps of: applying a first layer of electrically conductive material onto one surface of a base of insulating material, bonding the first layer to the surface, applying at least one thin layer of glass particles admixed with an organic metal compound in solution, the metal thereof being oxidized when fired in an oxidizing atmosphere to form a dielectric film onto the first layer, firing said layer of glass particles and organic metal compound in solution in an oxidizing atmosphere to fuse the glass to the layer of electrically conductive material and simultaneously converting the metal fraction thereof into an oxide of the metal to produce a dielectric film, applying a second layer of electrically conductive material onto the exposed surface of the fused on dielectric film, and bonding the second layer to the dielectric film.

2. The method of making a capacitor comprising the steps of: applying a thin film of electrically conductive material containing at least one of the noble metals not oxidizable below 800° C. onto one surface of a base of insulating material, applying a thin layer of a glass-forming organic metal compound in solution admixed with an organic metal compound in solution, the metal of which oxidizes when fired in an oxidizing atmosphere to form a dielectric onto the first layer, firing the layer of glass-forming organic compound in solution and organic metal compound in solution in an oxidizing atmosphere below 800° C. to fuse the glass to the conductive film and at the same time convert the metal fraction of the organic metal compound in solution into an oxide which is a dielectric thereby having the glass bond the metal fraction consisting of molecular particles together, and applying a second film of electrically conductive material containing at least one of the noble metals onto the top of the fused-on dielectric layer.

3. The method of claim 2, wherein the metal fraction of the organic metal compound in solution is chosen from the group consisting of tantalum, zirconium, niobium, aluminum, titanium, hafnium, and tungsten.

4. The method of claim 3, wherein the metal fraction of the organic metal compound in solution is admixed with a second organic metal compound in solution having at least one of the metals taken from the group consisting of barium, calcium, strontium, copper, nickel, lead, and tin.

5. The method of claim 4, wherein a titanium organic metal compound in solution and a barium organic metal compound in solution are admixed to produce barium titanate dielectric.

6. In the method of making a capacitor, the provision of a relatively thick base of heat resistant electrically non-conductive material forming a permanent support for the capacitor, bonding onto a surface of the base a first electrically conductive film, applying onto the surface of the film a relatively thin layer of material admixed with particles of glass-forming organic metal compounds in solution for bonding the layer to the film, the layer of material comprising at least one metal compound, the metal constituent thereof being selected from the group consisting of barium, calcium, strontium, copper, nickel, lead, and tin, reacted wtih at least one metal compound, the metal constituent of the compound being selected from the group consisting of zirconium, niobium, titanium, and hafnium, firing the base and said layer at temperatures sufficient to form pyrolyzed glass and bond the material to the electrically conductive film, and bonding onto the layer a second electrically conductive film.

References Cited
UNITED STATES PATENTS

| | | | |
|---|---|---|---|
| 3,002,861 | 10/1961 | Suchoff | 117—221 |
| 3,066,048 | 11/1962 | Mitchell | 117—221 |

FOREIGN PATENTS 1,139,063  10/1962  Germany.

WILLIAM L. JARVIS, *Primary Examiner.*

UNITED STATES PATENT OFFICE
CERTIFICATE OF CORRECTION

Patent No. 3,348,971                        October 24, 1967

Otis F. Boykin

It is hereby certified that error appears in the above numbered patent requiring correction and that the said Letters Patent should read as corrected below.

In the heading to the printed specification, lines 3 and 4, for "Otis F. Boykin, 8215 Maryland Ave., Chicago, Ill. 60619" read -- Otis F. Boykin, Chicago, Ill., assignor to CTS Corporation, Elkhart, Ind., a corporation of Indiana --; column 3, line 1, for "aaccompanying" read -- accompanying --.

Signed and sealed this 5th day of November 1968.

(SEAL)
Attest:

Edward M. Fletcher, Jr.                         EDWARD J. BRENNER

Attesting Officer                                  Commissioner of Patents